UNITED STATES PATENT OFFICE.

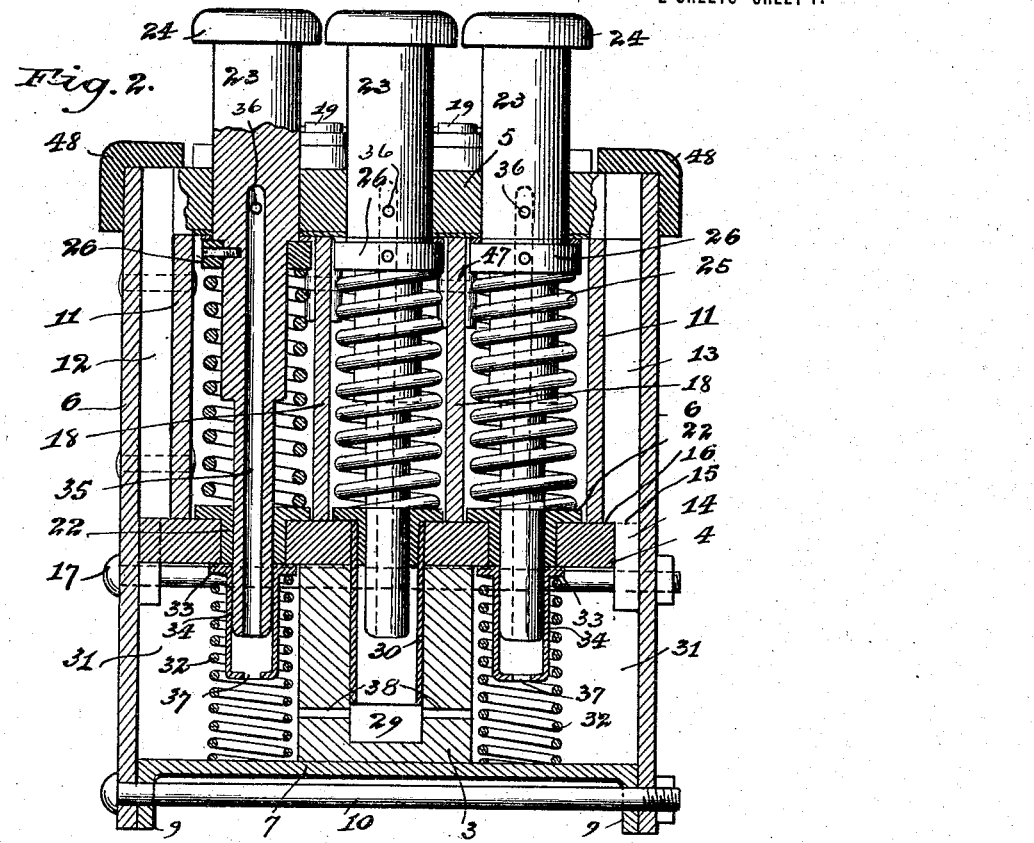
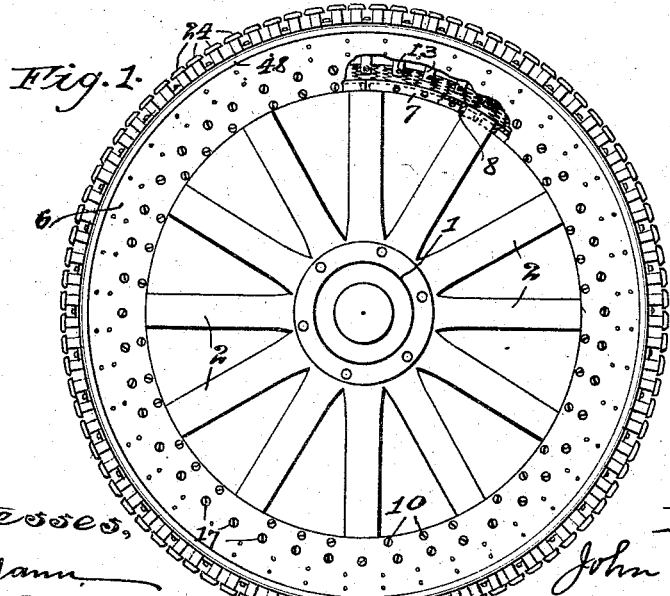

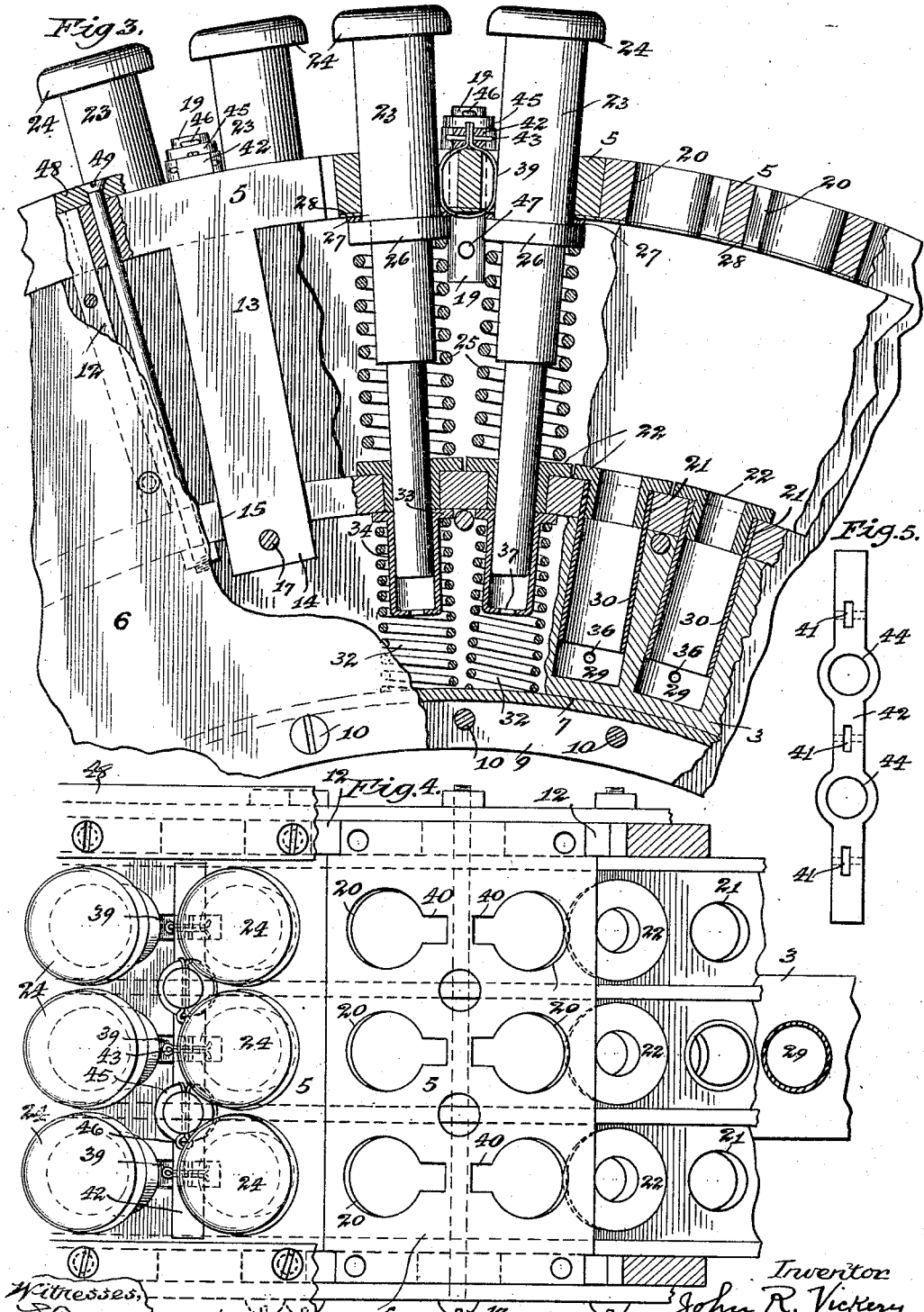

JOHN R. VICKERY, OF CHICAGO, ILLINOIS.

VEHICLE-TIRE.

1,183,782.

Specification of Letters Patent.

Patented May 16, 1916.

Application filed July 13, 1912. Serial No. 709,209.

*To all whom it may concern:*

Be it known that I, JOHN R. VICKERY, a citizen of the United States, residing at Chicago, in the county of Cook and State of Illinois, have invented certain new and useful Improvements in Vehicle-Tires, of which the following is a specification.

This invention relates to improvements in tires for automobiles and other vehicles; and has for its main object to provide a practical, economical and durable substitute for the pneumatic and solid rubber tires commonly employed to afford a cushion tread for such wheels.

My present invention relates to that general class of spring tires which employ a series of radially movable spring-backed members mounted within and projecting from the rim of the wheel. Numerous specific forms of this general type of spring tire have heretofore been proposed, but they have failed of adoption and use to any substantial extent by reason of various mechanical defects, such as liability to excessive wear, lack of sufficient strength to meet abnormal conditions of travel, a tendency to create an objectionable amount of clatter and other noise, and difficulty of replacing broken or injured parts. As a result of considerable practical experience with spring tires of this type, I have devised the novel construction which forms the subject matter of the present invention, and which has for its general object to obviate the defects and disadvantages hereinabove enumerated; and to provide a mechanical spring tire of ample strength to meet the severest loads and strains, while affording practically as sensitive a cushion tread as the standard pneumatic tire, and possessing a high degree of durability that is secured mainly through a self-lubricating feature for the radially movable spring-backed plungers which unitedly make up the yielding tread portion of the tire.

The invention, in one practical form in which it may be embodied, is illustrated in the accompanying drawings, in which—

Figure 1 is a side elevational view, partly broken out, of an automobile wheel equipped with the improved tire of my present invention. Fig. 2 is an enlarged transverse section through the rim of the tire. Fig. 3 is an enlarged side view, partly in elevation, and partly in longitudinal section in different longitudinal planes. Fig. 4 is an enlarged top plan view, with parts removed for greater clearness. Fig. 5 is a detail plan view of one of a series of transverse fastening strips employed on the outer side of the outer rim member for purposes hereinafter explained.

Referring to the drawings, 1 designates the hub, 2 the spokes, and 3 the felly of the wheel, which parts may be all as usual in automobile and like wheels, except for modifications of the felly hereinafter disclosed.

The rim which is mounted directly on the felly 3 is a hollow box-like structure, comprising essentially an inner rim-band 4 preferably in a single piece shrunk on the felly, a sectional outer rim-band that consists mainly of a series of substantially flat plates 5 transversely disposed, and a pair of annular side-plates 6 that extend width-wise from the outer sectional rim inwardly past the edges of the inner rim-band 4 to points opposite and slightly inwardly of the inner periphery of the felly 3. Fitted to the inner periphery of the felly 3 is another sectional band comprising a series of curved sections 7 of a width equal to that of the rim-band 4, and notched at their ends to straddle the spokes 2, as shown at 8 in Fig. 1. The sections 7 of this inner band have inwardly turned marginal flanges 9, and the sections are secured in place by bolts 10 passed through the flanges 9 and the inner margin of the side-plates 6, as clearly shown in Fig. 2.

Disposed inwardly of and parallel with the side-plates 6 is a pair of annular plates 11, the inner edges of which are fitted to the rim-band 4, while their outer edges are overlaid by the outer rim sections 5. The rim-plates 11 are secured in spaced relation to the side-plates 6 by a series of radially disposed spacing-strips 12 riveted or otherwise secured at intervals between said plates. The outer rim sections 5 are formed at their ends with radial extensions 13 that lie within and centrally of the chambers or recesses formed between the rim-plates 6 and 11 and adjacent spacing-strips 12. Said radial extensions 13 have narrowed lower end portions 14 (Fig. 2) that fit snugly within marginal notches 15 formed in the inner rim-band 4, and shoulders 16 that are stepped upon the rim-band 4 at the bases of said notches. The radial extensions 13 are strongly secured in place by bolts 17 that extend through the side-plates 6, the narrowed lower end portions 14 of the radial extensions 13, and the felly 3.

The space bounded by the inner and outer rim-bands and the annular side-plates 11 is divided into three annular chambers by a pair of annular partition-plates 18, best shown in Fig. 2. These partition-plates 18 are snugly fitted between the inner and outer rim-bands 4 and 5, and are rigidly secured in place by a series of tenons 19 secured thereto and extending through the outer rim-sections 5, as hereinafter more particularly described.

The outer rim-sections 5 are provided, each with a series of holes 20 (Fig. 4); each of said rim-sections having, as herein shown, two rows of three holes each disposed transversely of the outer rim. The inner rim-band 4 is formed with a corresponding series of holes 21 located in radial alinement with the holes 20. Within the inner holes 21 are fitted bushings 22; and the holes 20 and bushings 22 constitute bearings for a series of radially movable plunger-stems 23, the outer ends of which project some distance beyond the outer sectional rim members and are provided with heads 24 that unitedly constitute the tread of the tire. These plungers are backed by comparatively stiff coil compression springs 25 that surround the several plunger-stems within the annular chambers of the rim; said springs resting at their inner ends against the bushings 22, and at their outer ends abutting against collars 26 keyed on the plunger-stems. To eliminate the objectionable noise created by the rebound of the plungers after compression, I provide non-metallic washers 27 on the outer face of each collar 26; and to increase this sound-deadening effect I may also secure to the inner sides of the outer rim-section 5 rubber or fabric strips 28 to coöperate with the washers 27.

The felly 3 is radially bored at points opposite the holes 21 of the inner rim-band 4 forming sockets 29 affording play for the inner ends of the central series of plunger-stems; and preferably the felly is strengthened and reinforced to compensate for the excised stock by metal sleeves 30 driven therein.

On either side of the felly, and bounded by the latter, the rim-bands 4 and 7, and the inner portions of the side-plates 6, are annular chambers 31, across which the inner portions of the stems of the two outer series of plungers are free to operate. These chambers 31 afford a convenient accommodation for additional or auxiliary resistance springs 32 that rest at their inner ends against the rim-sections 7 and at their outer ends abut against the flanges 33 of thimbles 34 that surround the lower ends of the plunger stems; it being manifest that when the plunger has been depressed to a point where its inner end strikes the inner end of the thimble 34, the auxiliary spring 32 will come into play and add its resistance to the further inward movement of the plunger.

An important feature of my present invention resides in a self-oiling provision designed to greatly reduce the wear on the plunger-stems and their bearings in actual service. To this end, the chambers 31 are supplied with a suitable lubricant, and each of the plunger-stems is formed with an axial duct 35 extending from the inner end to a point normally opposite the outer bearing of the plunger, whence said axial duct communicates with the bearing by transverse ducts 36. The lower end of each thimble 34 is formed with a hole 37. Hence, it will be manifest that, with sufficient lubricant in the chambers 31 to substantially fill said chambers throughout the lower portions thereof, as the plungers reach the lowermost portions the said lubricant will pass through the ducts 35 and 36 to the outer bearings, and, at the same time, a sufficient quantity of said lubricant will find its way outwardly along the outside of the plunger-stems to thoroughly lubricate the inner bearings formed by the bushings 22. The central chambers or sockets 29 in the felly communicate with the side chambers 31 by lateral ducts 38, whereby lubricant is furnished to said central chambers or sockets for the lubrication of the central series of plunger-stems.

My invention also contemplates the provision of means to prevent rattle of the plunger-stems in their outer bearings when more or less worn, such rattle creating an objectionable noise that varies, of course, with the extent of wear and looseness of fit between the plungers and their bearings. The means I herein show for this purpose comprises a series of oval-shaped springs 39 (Figs. 3 and 4), that bear against the adjacent sides of adjacent plunger-stems. To accommodate these springs and secure the same in place, the adjacent holes 20 are formed with notches 40 on their adjacent sides, within which the opposite sides of the spring 39 lie. The two meeting end portions of the spring are bent outwardly and brought together and passed through a slot 41 formed in a fastening-strip 42 that overlies each outer rim-section 5 between the two transverse rows of plungers therein; said spring ends being confined in place by a cotter-pin 43. The inner portion of the spring is normally engaged and pressed outwardly by the shoulders 26 of the plunger-stems, or by the washers 27 thereon, thereby expanding the sides of the springs into firm contact with the sides of the plunger-stems with sufficient force to prevent any rattling of the latter due to a loose fit in its bearing. The fastening-strip 42 is also formed with holes 44, through which extend the tenons 19, the outer ends of said tenons being attached to the strip 42 by rings 45 and cotter-pins 46. The inner ends of the tenons 19 are forked to embrace the outer edges of the partition-plates 18, and are attached to the latter by cross-pins or rivets 47, as clearly shown in Figs. 2 and 3.

To protect the outer edges of side-plates 6 from undue wear, as well as to further reinforce and strengthen the structure as a whole, I preferably employ a pair of angle-iron hoops 48 that snugly fit the outer corners of the hollow rim structure. These hoops 48 are secured in place by means of counter-sunk screw bolts 49 that are passed through the hoops 48, the outer rim-sections 5, the chambers formed between the annular plates 6 and 11, and the inner rim-band 4, as best shown in Fig. 3.

The described construction provides a hollow rim of great strength and rigidity for the support of the radially movable spring-backed plungers that afford the cushion-tread. The self-lubricating feature obviously greatly reduces and practically eliminates the frictional wear between the plungers and their bearings, and the lubricant-chambers are completely inclosed and thoroughly protected from the access of dust and other foreign matter. The washers 27 effectively destroy the noise that would otherwise result from the impact of the abutments 26 against the inner side of the outer rim as the plungers pass from under the load; and, finally, the springs 39 effectively take up such slight wear as may occur between the plunger-stems and their outer bearings and prevent clatter and noise resulting from the lateral shaking of the plunger-stems in their supports. All of the radially movable parts, excepting the heads and outer stem portions of the plungers are completely housed by the rim-bands 5 and 7 and the side-plates 6 and protected against injury from accidental collision with extraneous objects as well as from the deteriorating influences of dust and dirt. It will be manifest to those skilled in the art that the specific details of the structure described and shown might be modified to a considerable extent without involving any departure from the principle of the invention or sacrificing any of the advantages secured thereby. The invention, therefore, is not limited to the precise and exact structure shown and described, except to the extent clearly indicated in specific claims.

I claim—

1. In a vehicle tire, the combination with a wheel felly, of a hollow rim member formed with an outer annular chamber and a pair of inner annular chambers disposed on opposite sides of said felly, respectively, and adapted to contain a lubricant, radially disposed plungers extending through said outer chamber and supported in bearings in the outer and inner walls of the latter and at their inner ends extending into said inner chambers, said plungers being formed with lubricant ducts extending from their inner ends to points opposite and communicating with their outer bearings, and springs surrounding said plungers within said outer chamber and normally urging said plungers outwardly.

2. In a vehicle tire, the combination with a wheel felly formed with a series of radial sockets and lateral ducts extending between said sockets and the outer sides of said felly, of a hollow rim member formed with an outer annular chamber and a pair of inner annular chambers disposed on opposite sides of said felly, respectively, and adapted to contain a lubricant, two outer series of radially disposed plungers extending through said outer chamber and supported in bearings in the outer and inner walls of the latter and at their inner ends extending into said inner annular chambers, an intermediate series of radially disposed plungers likewise supported in bearings in the outer chamber and extending into said felly sockets, all of said plungers being formed with lubricant-ducts extending from their inner ends to points opposite and communicating with their outer bearings, and springs surrounding said plungers within said outer chamber and normally urging said plungers outwardly.

3. In a vehicle tire, the combination with a hollow rim member formed with outer and inner annular chambers, of radially disposed plungers extending through said outer chamber and supported in bearings in the outer and inner walls of the latter and at their inner ends extending into said inner chamber, springs surrounding said plungers within said outer chamber and normally urging said plungers outwardly, and auxiliary springs within said inner chamber adapted to come into action after a partial inward movement of said plungers.

4. In a vehicle tire, the combination with a hollow rim member formed with outer and inner annular chambers, of radially disposed plungers extending through said outer chamber and supported in bearings in the outer and inner walls of the latter and at their inner ends extending into said inner chamber, springs surrounding said plungers within said outer chamber and normally urging said plungers outwardly, thimbles surrounding the inner ends of said plungers within said inner chamber and of a length greater than the inwardly projecting portions of said plunger-stems when the latter are in their outermost position, and auxiliary cushioning springs for said thimbles.

5. In a vehicle tire, the combination with a hollow rim member adapted to be applied to the felly of a wheel, of radially disposed plungers slidably supported in outer and inner bearings of said rim member, cushioning springs normally urging said plungers outwardly, and loop-shaped springs mounted in the outer periphery of said rim member respectively between and bearing upon adjacent sides of adjacent plungers.

6. In a vehicle tire, the combination with a hollow rim member adapted to be applied to the felly of a wheel, of radially disposed plungers slidably mounted in outer and inner bearings of said rim member, cushioning springs normally urging said plungers outwardly, loop-shaped springs mounted in the outer periphery of said rim member respectively between and bearing upon adjacent sides of adjacent plungers, and fastening-strips overlying said outer periphery and securing said loop-shaped springs thereto.

7. In a vehicle tire, a hollow rim member comprising an inner rim band adapted to fit the felly of a wheel, chambered side plates, and a sectional outer rim band the sections whereof are provided with integral radial extensions passing through said chambered side plates, in combination with bolts passing through and connecting said side plates and the lower ends of said radial extensions inwardly of said inner rim band, and radially disposed spring-backed plungers slidably mounted in said hollow rim member.

JOHN R. VICKERY.

Witnesses:
E. G. INGERSOLL,
SAMUEL N. POND.

Copies of this patent may be obtained for five cents each, by addressing the "Commissioner of Patents. Washington, D. C."